United States Patent [19]
Brainard

[11] Patent Number: 5,414,610
[45] Date of Patent: May 9, 1995

[54] UNIVERSAL POWER CONVERTER WITH SINGLE, SHARED POWER TRANSFORMATION CIRCUIT

[75] Inventor: Gerald L. Brainard, San Jose, Calif.

[73] Assignee: AST Research, Inc., Irvine, Calif.

[21] Appl. No.: 80,384

[22] Filed: Jun. 21, 1993

[51] Int. Cl.$^6$ ........................................... H02M 3/335
[52] U.S. Cl. ...................................................... 363/21
[58] Field of Search .................... 363/21, 34, 108, 109; 323/902

[56] References Cited

U.S. PATENT DOCUMENTS

| | | |
|---|---|---|
| 3,769,571 | 10/1973 | Wilkinson . |
| 4,185,315 | 1/1980 | Miller . |
| 4,608,498 | 8/1986 | Falzarano et al. . |
| 4,641,234 | 2/1987 | Bonal . |
| 4,780,805 | 10/1988 | Chewuk et al. . |
| 4,794,948 | 1/1989 | Schempp . |
| 4,849,869 | 7/1989 | Tanuma et al. ........................ 363/21 |
| 4,969,007 | 11/1990 | Otani et al. . |

Primary Examiner—Steven L. Stephan
Attorney, Agent, or Firm—Knobbe, Martens Olson & Bear

[57] ABSTRACT

A power conversion method and apparatus convert an AC input voltage signal or a DC input voltage signal to a DC output voltage signal suitable for driving a DC load. The power converter includes a first voltage stage coupled to a first pair of input terminals to receive a rectified AC input voltage signal. A second voltage stage is coupled to a second pair of input terminals to receive a DC input voltage signal from a battery source. A transistor drive circuit is connected between the input terminals and the first and second voltage stages. The drive circuit causes energy to be stored in either the first or second voltage stage depending upon whether an AC or a DC voltage signal is applied to the input terminals. The stored energy is released to a third voltage stage to produce a DC output voltage at output terminals coupled to a power supply of a portable device, such as a personal computer.

30 Claims, 2 Drawing Sheets

UNIVERSAL POWER CONVERTER WITH SINGLE, SHARED POWER TRANSFORMATION CIRCUIT

BACKGROUND OF THE INVENTION

The invention relates generally to a power conversion apparatus and, more specifically, to a universal combination VAC and VDC power conversion apparatus for portable electronic and electrically powered devices such as, for example, a personal computer.

Portable personal computers (PCs) and many other electronic devices are required to operate both from conventional alternating current (AC) mains and battery direct current (DC) power sources. Power conversion apparatus are known in the art which perform both the AC-DC and DC-DC conversions required to power such devices. An example of an apparatus which converts either AC or DC to DC power is disclosed in U.S. Pat. No. 3,769,571 to Wilkinson.

The apparatus disclosed in Wilkinson, as well as other similar power conversion apparatii known in the art, employs separate power conversion circuitry with respect to the AC to DC and the DC to DC conversions. For this reason, there exists a certain amount of duplicate circuitry within the converter. For example, each of the AC and the DC conversion circuits includes a switching circuit comprising two bipolar junction transistors (BJTs), each of which are shunted by a diode, and a transformer having two primary and one secondary windings. A third transformer, having a double primary winding, is also provided to invert the power prior to applying it to a DC load. In addition to having needlessly redundant circuitry, under certain power conditions, the efficiency of the multiple transformer arrangement is limited by its use of BJTs.

Accordingly, what is needed is an AC/DC power converter that overcomes the redundances previously required in the prior art, thereby reducing the size, weight and cost of the converter, and increasing its efficiency.

SUMMARY OF THE INVENTION

The foregoing problems are solved and a technical advance is achieved by method and apparatus for converting both traditional AC mains and battery DC power to a level of DC power suitable for driving a load, such as a portable PC, via a single transformer. In a preferred embodiment, the power converter of the present invention comprises a plurality of voltage stages, embodied in a power conversion transformer having a first primary winding, which is optimized for operation from rectified AC mains voltage and is electrically coupled to pair of AC input terminals via a full-wave diode bridge rectifier, a second primary winding, which is optimized for operation from battery DC voltage and which is electrically coupled to DC input terminals, and a single secondary winding, which is electrically coupled to the power supply of a portable PC via converter output terminals.

The transformer is driven by a controller driver unit, embodied in a transistor drive circuit comprising first and second field effect transistors optimized for operation within the range of voltage and current produced by the AC mains and the battery DC power sources, respectively, which are coupled to the first and second primary windings, respectively. The transistor drive circuit further comprises a current mode pulse width modulated controller (modulator) for actuating the transistors between on and off states and a start-up regulator for providing start-up power for the modulator when the converter is operating from an AC input signal. Operation of the modulator is regulated by two control signals, which include a current feedback signal ($I_{fb}$) for monitoring the current through the active primary, and a voltage feedback signal ($V_{fb}$) for adjusting the amount of energy stored in the active primary to maintain regulation output. It is understood that the "active primary" is the first primary winding, when the converter is operating from an AC input signal (AC operation) and the second primary winding when the converter is operating from a DC input signal (DC operation).

During AC operation, a preferred 120–240 volt AC (VAC) signal from the mains is input through the AC input terminals. The signal is rectified by the bridge rectifier, filtered through a first capacitor and then supplied to the first primary winding. Responsive to control signals $I_{fb}$ and $V_{fb}$, the modulator actuates both transistors between on and off states, causing energy in the form of current to be alternately stored in the first primary winding when the transistors are driven on and released to the secondary winding when the transistors are turned off. Energy through the secondary winding charges a second capacitor, producing an output voltage signal ($V_o$) at a pair of output terminals.

During DC operation, a preferred 12 volt DC (VDC) signal from a battery source is input the DC input terminals. The signal bypasses the bridge rectifier and capacitor and is supplied directly to the modulator and the second primary winding. Similarly to AC operation, the transistor drive circuit actuates the transistors between on and off states, causing energy to be alternately stored in the second, rather than the first, primary winding, and then released to the secondary winding, charging the second capacitor to product a signal $V_o$ at the output terminals.

The transistor drive circuit is configured such that during DC operation, the first transistor functions as a synchronous rectifier that charges the AC input storage capacitor to a voltage level sufficient to allow the converter to continue to operate during short DC dropouts.

A technical advantage achieved with the present invention is the reduction in the size, weight and cost of the converter over conventional AC or DC to DC power converters of slightly less than fifty percent (50%), due to the fact that the only duplication of circuitry embodied in the converter of the present invention is a double primary winding on the transformer and an extra transistor and drive components for driving the additional primary winding.

A further technical advantage achieved with the present invention is that, under certain power conditions, the efficiency of the converter is increased due to the use of field effect transistors rather than BJTs.

DETAILED DESCRIPTION OF THE PREFERRED EMBODIMENT

Figure 1:
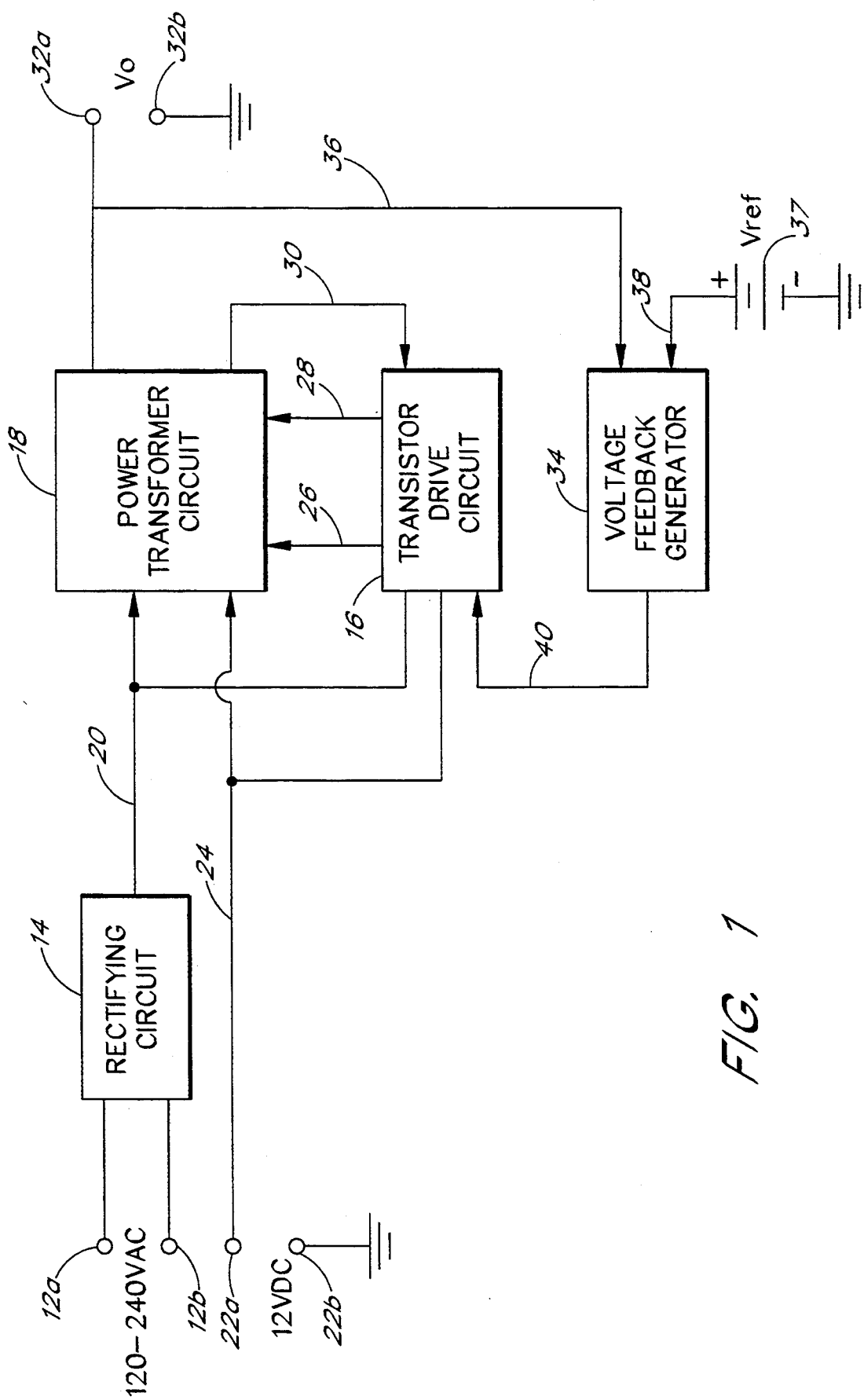
FIG. 1 is a functional block diagram of the universal VAC and VDC power converter of the present invention.

Referring to FIG. 1, the reference numeral 10 designates a universal power converter according to the present invention. In one embodiment, the converter 10 may be used to convert 90-270 volts, 120-240 volts preferred, alternating current (VAC) or any direct current voltage (VDC), 12 volts preferred, to a level of DC voltage suitable for operating a portable personal computer (PC). Other AC and DC voltages may be set by the skilled artisan and the values used in the present embodiment are intended as a preferred embodiment only, and not intended to limit the invention to the values described.

The converter 10 comprises a pair of AC input terminals 12a and 12b, through which a 120-240 VAC signal is input to a rectifying circuit 14, which rectifies and filters the signal. The filtered and rectified voltage signal output by the rectifying circuit 14 is input to a transistor drive circuit 16 and a power transformer circuit 18 via a line 20. The converter 10 also includes a pair of DC input terminals 22a and 22b, through which a 12 VDC signal is directly input to the transistor drive circuit 16 and the power transformer circuit 18 via a line 24. The power transformer is actually a specific embodiment of a first voltage stage, which corresponds to a first primary of the transformer, a second voltage stage, which corresponds to a second primary of the transformer, and a third voltage stage, corresponding to a secondary of the transformer. A more comprehensive description of the transformer is described below.

The power transformer circuit 18 is electrically coupled to the transistor drive circuit 20 via three lines 26, 28, and 30. The transistor drive circuit serves as a controller driver of the converter, which controller driver controls the first and second voltage stages of the transformer. Signals output by the transistor drive circuit on lines 26 and 28 are input to the power transformer circuit 18 and are used to drive the power transformer circuit 18. During AC operation, operating voltage is supplied to the transistor drive circuit 20 by the power transformer circuit 18 via line 30. During DC operation, the transformer circuit 16 is powered directly from the DC input signal.

A voltage output signal ($V_o$) is output from the power transformer circuit 18 at a pair of terminals 32a and 32b. $V_o$ is further supplied to a voltage feedback generator 34 via a line 36. A voltage reference signal ($V_{ref}$), generated by a voltage source 37, is also supplied to the voltage feedback generator 34 via a line voltage feedback generator 34 is sent to the transistor drive circuit 20 via a line 40. Another feedback signal, a current feedback signal ($I_{fb}$) is generated by and used internal to the transistor drive circuit 20. The use of $V_{fb}$ and $I_{fb}$ by the power transformer circuit 18 as control signals will be subsequently discussed in detail with reference to FIG. 2.

Figure 2:
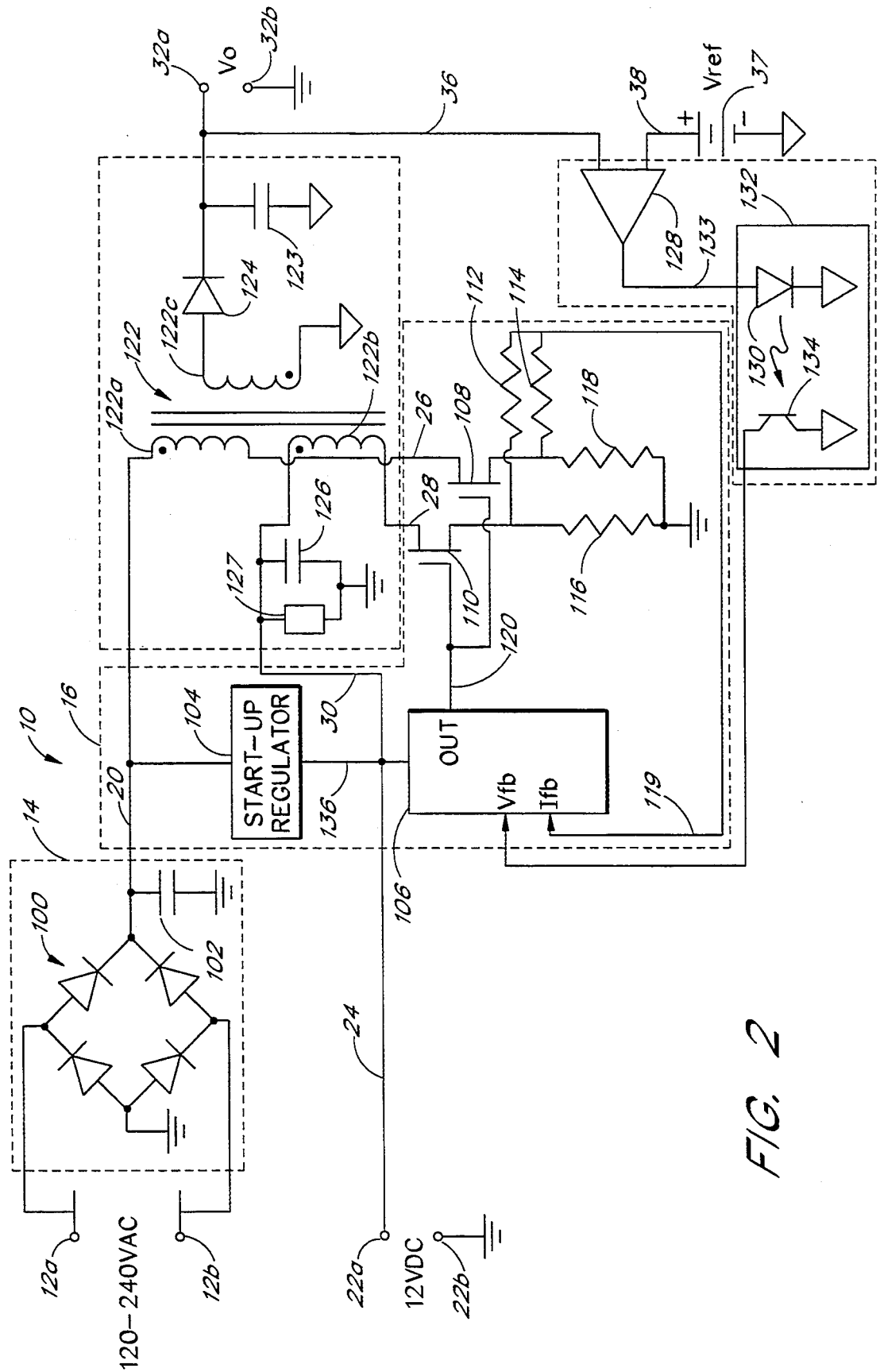
FIG. 2 is a schematic diagram of the power converter of FIG. 1.

FIG. 2 illustrates the converter 10 in schematic form. The components of FIG. 1 are indicated in FIG. 2 with dashed lines and are labeled accordingly.

The rectifying circuit 14 comprises a full-wave diode bridge rectifier 100 connected in parallel across the terminals 12a and 12b for rectifying the signal input during AC operation, and a capacitor 102 connected to the output of the rectifier 100 for filtering the rectified AC signal.

The transistor drive circuit 16 comprises a start-up regulator 104, a current mode pulse width modulated controller 106, two transistors 108 and 110, and four resistors 112, 114, 116 and 118. The start-up regulator 104 is connected to and provides start-up power for the modulator 106 during AC operation. During DC operation, the modulator 106 is powered directly from the 12 VDC input signal. The modulator 106 is electrically coupled to the base of the transistors 108 and 110 via a line 120 for simultaneously actuating the transistors 108 and 110 between on and off states responsive to the feedback control signals Vfb and Ifb on lines 40 and 119, respectively. It is understood that the transistors 108 and 110 are optimized for operation from rectified AC mains and battery DC voltages, respectively.

The power transformer circuit 18 comprises a transformer 122 having two primary windings 122a and 122b, which are optimized for operation from rectified AC mains and battery DC voltages, respectively, and a single secondary winding 122c, which is electrically coupled to the output terminals 32a and 32b. The transformer circuit 18 further comprises a capacitor 123 connected in parallel with the output terminals 32a and 32b for generating Vo, a diode 124 connected between the secondary winding and the capacitor 123 for preventing current from flowing out of the capacitor 123 back through the secondary winding, and a capacitor 126 for supplying operating voltage to the modulator 106 during AC operation. A regulator 127 is connected in parallel with the capacitor 126 to prevent the capacitor 126 from supplying voltage to the modulator 106 in excess of the safe operating voltage range therefor.

The voltage feedback generator 34 comprises an error amplifier 128, the output of which is coupled to the anode of a light emitting diode (LED) 130 of an optical coupler 132 via a line 133. Also within the optical coupler 132 is a transistor 134, the collector of which is electrically coupled to the modulator 106 via line 40.

During AC operation, a VAC signal, such as, for example, a 120-240 VAC signal, is applied to the terminals 12a and 12b and input the rectifying circuit 16, which rectifies and filters the input signal. The rectified and filtered signal is then supplied to the transistor drive circuit 16 and the power transformer circuit 18 via a line 20. As previously indicated, the start-up regulator 104 supplies the start up power for the modulator 106 via a line 136. Operating voltage for the modulator 106 is supplied by the capacitor 126, which is charged during the energy storage portion of the conversion cycle.

Responsive to the control signals $V_{fb}$ and $I_{fb}$ on lines 40 and 119, respectively, the modulator 106 actuates the transistors 108 and 110 between on and off states. When the transistors 108 and 110 are on, energy in the form of current is stored in the primary winding 122a. When modulator 106 drives the transistors 108 and 110 off, the stored energy is released through the secondary winding 122c, causing current to flow through the diode 124 and charge the capacitor 123 via a line 136. As a result, a $V_o$ signal is produced across the output terminals 32a and 32b.

Further, because transistors 108 and 110 are actuated simultaneously, the capacitor 126 is charged to a voltage which is proportional to the rectified AC input voltage in the same ratio as the windings ratio of primary windings 122a and 122b. As a result, the supply of operating voltage to the modulator 106 is maintained during AC operation, as previously indicated.

During DC operation, the modulator 106 is powered directly from, for example, a 12 VDC source. Similarly to AC operation, energy is alternately stored in the other of the primary windings 122b and released through the secondary winding 122c as the modulator 106 actuates the transistors 108 and 110 between on and off states responsive to $V_{fb}$ and $I_{fb}$.

It is understood that, while the input operating current will be substantially greater during DC operation than during AC operation, the operating voltage will be substantially less. Accordingly, the primary winding 122a and the transistor 108 are optimized for operation at high voltage and low current, whereas the primary winding 122b and the transistor 110 are optimized for operation at low voltage and high current. Selection of appropriate components for the primary windings 122a and 122b and the transistors 108 and 110 will allow for maximum efficiency during both AC and DC operation.

As previously indicated, the modulator 106 is controlled by $V_{fb}$ and $I_{fb}$, which are input the modulator 106 via a line 40 and a line 119, respectively. $V_{fb}$ on line 40 is used in adjusting the amount of energy stored in the active primary winding 122a or 122b to maintain output regulation. $I_{fb}$ is used in monitoring the current through the active primary winding 122a or 122b and to cause the transistor 108 and 110 to be switched off at the desired point.

$V_{fb}$ is generated by inputting Vo and Vref to the error amplifier 128 via lines 36 and 38, respectively. The signals are compared by the error amplifier 128 and the current output from the amplifier 128 is input to the optical coupler 132 via the line 133 and throughput the LED 130 located therein. The current on line 133 is at a level sufficient to cause the transistor 134 to maintain $V_{fb}$ on line 40 at the operating point that will sustain output regulation. It is understood that the voltage source 123 is typically powered from $V_o$ and may comprise, for example, a Zener diode (not shown) with current supplied from $V_o$ through a resistor (not shown).

$I_{fb}$ is actually a voltage signal generated across the resistor 114, during AC operation, or the resistor 112, during DC operation, supported by current through the corresponding primary winding 122a or 122b and transistor 108 or 110.

It should be noted that, due to obvious safety considerations, connection of the converter 10 to AC and DC power sources simultaneously must be avoided, since there is no isolation between the AC and DC input terminals. For this reason, there should be provided in any embodiment of the converter 10 means for preventing simultaneous connection of AC and DC from occurring, for example, a mechanism which covers the DC input terminals while AC mains voltage is connected to the AC input terminals.

It is understood that the present invention can take many forms and embodiments. The embodiments shown herein are intended to illustrate rather than to limit the invention, it being appreciated that variations may be made without departing from the spirit of the scope of the invention. For example, the converter 10 may be implemented in devices other than portable PCs, which devices require stable operating voltages generated from either AC mains or DC battery power sources, such as portable entertainment systems, other computing devices, and various testing equipment. Further, although as embodied herein, the converter 10 is implemented via a flyback-type circuit, the converter 10 may be implemented using other standard power conversion techniques that transfer energy from the transformer primary to the secondary during the same phase, such as push-pull, half bridge and full bridge configurations. It will also be appreciated that different elements of the converter 10 may be embodied as a single integrated chip, or any varying combination of discrete components interconnected in a standard manner.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A power converter for converting an input voltage signal to a DC output voltage signal for driving a DC load, said power converter comprising:
    a first set of input terminals for receiving an AC input voltage signal;
    a second set of input terminals for receiving a DC input voltage signal;
    a single, shared power transformation circuit directly connected to said first set and said second set of input terminals, said power transformation circuit comprising:
    a first voltage stage coupled to said first set of input terminals;
    a second voltage stage coupled to said second set of input terminals; and
    a third voltage stage coupled to said first and second voltage stages for convening said input voltage signal to said DC output voltage signal, said third voltage stage further including a set of output terminals connected to said DC load; and;
    a controller driver connected between said first and second set so input terminals and said first and second voltage stages for during a selected one of said first and second voltage stages.

2. The power converter of claim 1 wherein said first voltage stage and said second voltage stage respectively conform to a first primary winding and a second primary winding of a transformer, and said third voltage stage corresponds to a secondary winding connected to said output terminal of said transformer.

3. The power converter of claim 1 wherein said controller driver is a transistor.

4. The converter of claim 1 further comprising:
    a bridge rectifier connected in parallel with said first input terminals for rectifying said AC input voltage signal.

5. The converter of claim 4 wherein said bridge rectifier comprises a full wave diode bridge rectifier.

6. The converter of claim 1 wherein said AC input voltage signal comprises a 90–270 volt AC signal.

7. The converter of claim 1 wherein said DC input voltage signal comprises a 12 volt DC signal.

8. The converter of claim 3 wherein said controller driver further comprises:
    first and second transistors coupled to said first and second voltage stages, respectively; and
    a current mode pulse width modulated controller connected to said transistors collectively for actuating said transistors between a first power state and a second power state responsive to control signals.

9. The converter of claim 8 wherein said controller driver further comprises:
a start-up regulator connected to said modulated controller for starting said modulated controller when said AC input signal is being received at said first input terminals.

10. The converter of claim 8 wherein said control signals comprise a current feedback signal and a voltage feedback signal.

11. The converter of claim 8 wherein energy in the form of current is stored in said first voltage stage when said AC input voltage signal is received at said first input terminals and said transistors are actuated to said first power state.

12. The converter of claim 8 wherein energy in the form of current is stored in said second voltage stage when said DC input voltage signal is received at said second input terminals and said transistors are actuated to said first power state.

13. The converter of claim 8 wherein energy in the form of current is released through said second voltage stage to produce said DC output voltage signal at said output terminals when said transistors are actuated to a second state.

14. The converter of claim 10 further comprising:
a feedback voltage generating circuit connected to said controller for generating said feedback voltage control signal.

15. The converter of claim 14 wherein said feedback voltage generating circuit further comprises:
an error amplifier for comparing said DC output voltage signal with a voltage reference signal input thereto; and
an optical coupler connected between said error amplifier and said controller for producing said voltage output signal responsive to a signal output said error amplifier.

16. The converter of claim 1 wherein said DC load is a portable personal computer.

17. A power converter for converting an input voltage signal to a DC output voltage signal for driving a DC load, said power converter comprising:
a first set of input terminals for receiving art AC input voltage signal;
a second set of input terminals for receiving a DC input voltage signal;
a single, shared transformer comprising a first primary winding directly connected to said first set of input terminals, a second primary winding directly connected to said second set of input terminals, and a secondary winding connected to a set of output terminals, wherein said set of output terminals is further connected to said DC load; and
a transistor drive circuit connected between said first and second sets of input terminals and said primary windings of said transformer for driving a selected one of said primary windings to convert said input voltage signal to said DC output voltage signal.

18. The converter of claim 17 further comprising:
a bridge rectifier connected in parallel with said first input terminals for rectifying said AC input voltage signal.

19. The converter of claim 18 wherein said means for rectifying comprises a full wave diode bridge rectifier.

20. The converter of claim 17 wherein said AC input voltage signal comprises a 120–240 volt AC signal.

21. The converter of claim 17 wherein said DC input voltage signal comprises a 12 volt DC signal.

22. The converter of claim 17 wherein said transistor drive circuit further comprises:
first and second transistors coupled to said first and second primary windings, respectively; and
a current mode pulse width modulated controller connected to said transistors collectively for actuating said transistors between a first power state and a second power state responsive to control signals.

23. The converter of claim 22 wherein said transistor drive circuit further comprises:
a start-up regulator connected to said modulated controller for starting said modulated controller when said AC input signal is being received at said first input terminals.

24. The converter of claim 22 wherein said control signals comprise a current feedback signal and a voltage feedback signal.

25. The converter of claim 22 wherein energy in the form of current is stored in said first primary winding when said AC input voltage signal is received at said first input terminals and said transistors are actuated to said first power state.

26. The converter of claim 22 wherein energy in the form of current is stored in said second primary winding when said DC input voltage signal is received at said second input terminals and said transistors are actuated to said first power state.

27. The converter of claim 22 wherein energy in the form of current is released through said secondary winding to produce said DC output voltage signal at said output terminals when said transistors are actuated to a second state.

28. The converter of claim 24 further comprising:
a feedback voltage generating circuit connected to said controller for generating said feedback voltage control signal.

29. The converter of claim 28 wherein said feedback voltage generating circuit further comprises:
an error amplifier for comparing said DC output voltage signal with a voltage reference signal input thereto; and
an optical coupler connected between said error amplifier and said controller for producing said voltage output signal responsive to a signal output said error amplifier.

30. The converter of claim 17 wherein said DC load is a portable personal computer.

* * * * *

UNITED STATES PATENT AND TRADEMARK OFFICE
CERTIFICATE OF CORRECTION

PATENT NO. : 5,414,610
DATED : May 9, 1995
INVENTOR(S) : Gerald L. Brainard

It is certified that error appears in the above-indentified patent and that said Letters Patent is hereby corrected as shown below:

In Claim 1, at line 22, change "set so input" to --set of input--.

In Claim 1, at line 23, change "during" to --driving--.

Signed and Sealed this

Eighth Day of April, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,414,610      Page 1 of 1
DATED : May 9, 1995
INVENTOR(S) : Gerald L. Brainard It is certified that error appears in the above-identified patent and that said Letters Patent is hereby corrected as shown below:

<u>Column 6,</u>
Line 36, change "convening" to -- converting --.

Signed and Sealed this

Twenty-fifth Day of June, 2002

Attest:

JAMES E. ROGAN
*Attesting Officer*      *Director of the United States Patent and Trademark Office*